United States Patent

[15] 3,641,975

Level

[45] Feb. 15, 1972

[54] TUBE WINDING APPARATUS

[72] Inventor: Bertrand P. E. Level, Le Vesinet, France

[73] Assignee: Plastres-Manurhin S.A.R.L., Mulhouse-Bourtzwiller, France

[22] Filed: Mar. 12, 1970

[21] Appl. No.: 18,936

[30] Foreign Application Priority Data

Mar. 21, 1969 France..................................6908282

[52] U.S. Cl..............................118/107, 118/120, 156/173, 156/425

[51] Int. Cl......................................................B31c 11/04

[58] Field of Search.................118/100, 102, 107, 109, 120, 118/123, 126; 242/157, 157.1; 156/535, 169, 459, 173, 466, 440, 439, 425

[56] References Cited

UNITED STATES PATENTS

| 840,353 | 1/1907 | Lyford | 118/120 |
| 3,304,909 | 2/1967 | Hart et al. | 118/107 X |
| 3,431,158 | 3/1969 | Poulsen | 156/173 |

FOREIGN PATENTS OR APPLICATIONS

| 1,361,435 | 4/1964 | France | 156/173 |

*Primary Examiner*—Leon G. Machlin
*Attorney*—Arthur O. Klein

[57] ABSTRACT

Apparatus for fabricating tubes by winding elongated fibers or filaments impregnated with synthetic resin upon a mandrel or core. The filaments are guided to be laid upon the mandrel in a desired manner by a filament guide mounted upon a carriage which reciprocates parallel to the axis of the mandrel. A scraper or doctor blade, preferably made of elastomeric material, is mounted on the carriage so as to reciprocate therewith, the blade being constantly resiliently urged into contact with the winding on the mandrel in a longitudinal zone including that of the instantaneous winding but spaced angularly therefrom so as to remove excess resin from the winding on the mandrel.

9 Claims, 2 Drawing Figures

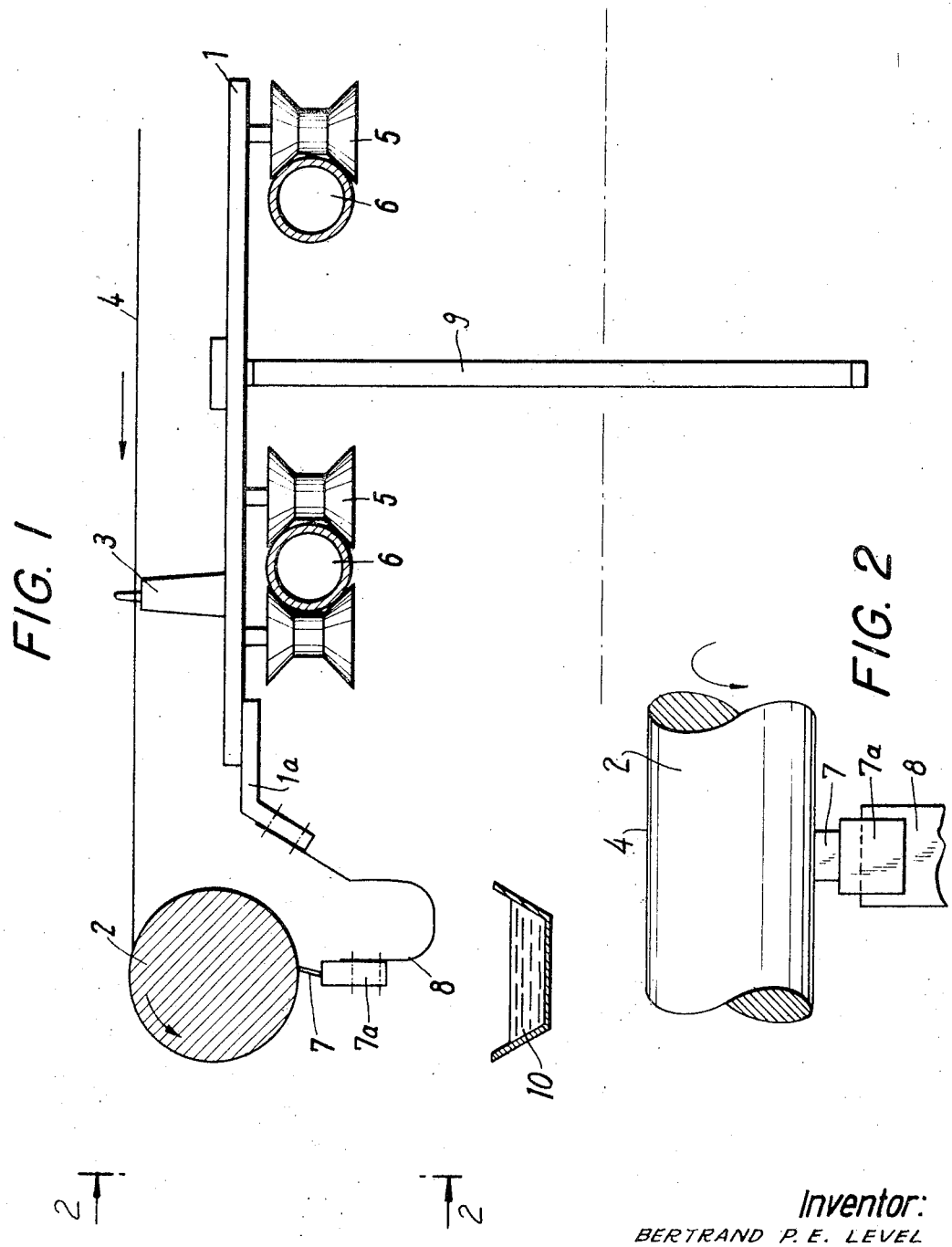

3,641,975

TUBE WINDING APPARATUS

This invention relates to an apparatus for manufacturing tubes, and more particularly to an apparatus for winding resin impregnated fibers or filaments in a predetermined desired configuration so as to produce a tube.

Such machine includes means for supporting a mandrel and rotating it about its axis, and a carriage carrying a filament guide which is reciprocated parallel to the axis of the mandrel in such manner as to lay the filaments helically upon the mandrel. Before being wound upon the mandrel, the filaments are impregnated with synthetic resin. During the winding operation, excess resin accumulates upon the layers of previously laid winding by being squeezed out of the winding by the tensioned filament then being wound upon it.

At low winding speeds, the excess resin flows or drips downwardly from the bottom of the winding, to be collected in a suitable pan or the like. As the speed of winding is increased, however, the excess resin is thrown in all directions by the centrifugal force to which it is subjected. Winding speed is thus limited by this phenomenon, since the filaments can be impregnated at higher speeds which are far less than that of which the various mechanical parts of the apparatus are capable.

In accordance with the invention, in order to overcome the above-discussed disadvantages of the prior apparatus, the filament guide carriage is provided with a scraper member which is yieldably pressed against it, whereby the scraper member removes the excess resin from the zone of the winding upon which the filament is being wound. Preferably the scraper member is mounted on the filament guide carriage through the intermediary of a leaf spring.

The advantage of mounting the scraper member on the carriage is that the scraper member is in contact with only those filaments of winding over which the further filaments of the next layer of the winding are immediately to be laid; the scraper members, being axially short, do not engage simultaneously all of the filaments of the previously laid down winding. This limits the possible deterioration of the filaments by excessive contact with the scraper member.

In order to better understand how the present invention may be carried out, there is described hereinafter as a nonlimiting example, a preferred embodiment of apparatus of the invention, which is shown in the accompanying drawings.

In the drawings:

FIG. 1 is a somewhat schematic view, partially in side elevation and partially in vertical transverse section, of such preferred embodiment of the apparatus; and FIG. 2 is a fragmentary view in front elevation of the apparatus, the view being taken from line 2—2 of FIG. 1.

In the drawings, for the sake of simplicity of illustration of the invention, parts of the winding apparatus which are conventional are emitted or shown schematically. The apparatus has a filament guide carriage 1 which is driven to reciprocate along a path parallel to the axis of a mandrel or core 2 which is driven counterclockwise (FIG. 1) at constant speed. Carriage 1 has a filament guide 3 in the form of a comb fixedly secured thereto. Filaments 4 impregnated with synthetic resin pass horizontally between the teeth of guide 3 on their way to the top of the mandrel 2 to be wound thereon. The carriage 1 is guided by rollers 5 journaled on the carriage, the rollers cooperating with fixed guide bars 6 as shown. The carriage may be driven for reciprocation in a number of manners, not a part of this invention; the reciprocating means for the carriage may be drivingly connected, for example, to a bracket member 9 which is affixed to the carriage and depends therefrom.

In accordance with the invention, a scraper member 7 is mounted vertically in a clamplike holder 7a which is fixedly connected to the upper end of one leg of an upright U-shaped leaf spring 8, the upper end of the other leg of the spring being affixed to an angle bracket member 1a affixed to the carriage. Scraper member 7, which is preferably made as a thin plate or blade of rubber or rubberlike material, is constantly yieldably pressed upwardly in a vertical radial direction against the bottom of the mandrel 2 and/or the winding thereon by the leaf spring 8. The spring 8 yields to permit the scraper member 7 to move downwardly as the diameter of the winding of filaments on the mandrel increases. Excess resin removed from the mandrel and/or winding thereon may be caught in an elongated pan or tank 10, or in an axially short tank affixed to the carriage, disposed beneath the mandrel and parallel thereto.

As shown in FIG. 2, the scraper member 7 is of short axial length, and is so disposed that the path 4a of the filaments being wound lies generally centrally within the zone of the mandrel and/or winding swept by the scraper blade in each revolution of the mandrel.

In the embodiment shown, the scraper member 7 lies displaced about 180° from the top of the mandrel where the filaments 4 first engage the winding. At the ends of the winding the windings are of extra thickness. The short axial length of the scraper member 7 permits it to tip through a small angle with respect to the axis of the mandrel, thereby to accommodate itself to such change of contour of the winding at the ends of the tube and to remove excess resin therefrom.

Although this invention is illustrated and described with reference to one preferred embodiment thereof, it is to be understood that it is in no way limited to the disclosure of such a preferred embodiment but is capable of numerous modifications within the scope of the appended claims.

What is claimed is:

1. In a tube winding apparatus having a rotatable, horizontally disposed mandrel, means for supporting and driving the mandrel, a filament guiding carriage, and means for supporting and driving the carriage for reciprocation along the length of the mandrel, and means for impregnating the filaments with a curable resin, the improvement which comprises a scraper member mounted upon the carriage for reciprocation therewith, said scraper engaging the surface of the winding which has been wound upon the mandrel, and means for yieldingly thrusting the scraper member against the winding to remove excess resin therefrom.

2. In a tube winding apparatus having a rotatable mandrel disposed horizontally, means for supporting and driving the mandrel, a filament guiding carriage, and means for supporting and driving the carriage for reciprocation along the length of the mandrel, and means for impregnating the filaments with a curable resin, the improvement which comprises a scraper member which is disposed to engage the bottom surface of the winding which has been wound upon the mandrel, and means for yieldingly thrusting the scraper member against the winding to remove excess resin therefrom.

3. Apparatus according to claim 2, wherein the scraper member sweeps substantially only a narrow zone of the winding which is to be overlaid by the portion of the turn of the filaments which is then being applied to the winding which lies between the location of first engagement of such turn with the winding and the scraper member.

4. In a tube winding apparatus having a rotatable, horizontal disposed mandrel, means for supporting and driving the mandrel, a filament guiding carriage, and means for supporting and driving the carriage for reciprocation along the length of the mandrel, and means for impregnating the filaments with a curable resin, the improvement which comprises a scraper member which engages the surface of the winding which has been wound upon the mandrel, and means for yieldingly thrusting the scraper member against the winding to remove excess resin therefrom, the scraper member being short in the direction of the axis of the mandrel, and means securing the scraper member to the carriage for reciprocation therewith.

5. Apparatus according to claim 4, wherein the mandrel is disposed horizontally, filaments enter upon the mandrel and winding at the top thereof, and the scraper member is disposed to engage the winding at the bottom of the mandrel.

6. Apparatus according to claim 4, comprising a leaf spring which is interposed between the scraper member and carriage and supports the scraper member thereon.

7. Apparatus according to claim 6, wherein the leaf spring is in the form of an upright U, one leg of the spring being secured at its upper end to the carriage, and the scraper member being secured to the upper end of the other leg of the spring.

8. Apparatus according to claim 1, wherein the scraper member is made in the form of a blade of elastic material.

9. Apparatus according to claim 8, wherein the scraper member is made of rubberlike material.

* * * * *